May 19, 1936.　　　　G. D. GARDNER　　　　2,041,060

CAN FILLING MACHINE

Filed Jan. 15, 1934

INVENTOR.
GEORGE D. GARDNER
BY
Miller Boyken & Bird
ATTORNEYS.

Patented May 19, 1936

2,041,060

UNITED STATES PATENT OFFICE 2,041,060

CAN FILLING MACHINE

George D. Gardner, San Jose, Calif.

Application January 15, 1934, Serial No. 706,613

12 Claims. (Cl. 226—69)

This invention relates to devices for cutting fruit and for depositing the cut fruit in cans.

One of the objects of the invention is the provision of a simpler and more efficient means for cutting fruit and for filling the cans therewith than heretofore. Other objects and advantages will appear in the following specification and drawing.

In the drawing, Fig. 1 is a side view of my device, partially broken away to fit the sheet.

Figure 1:
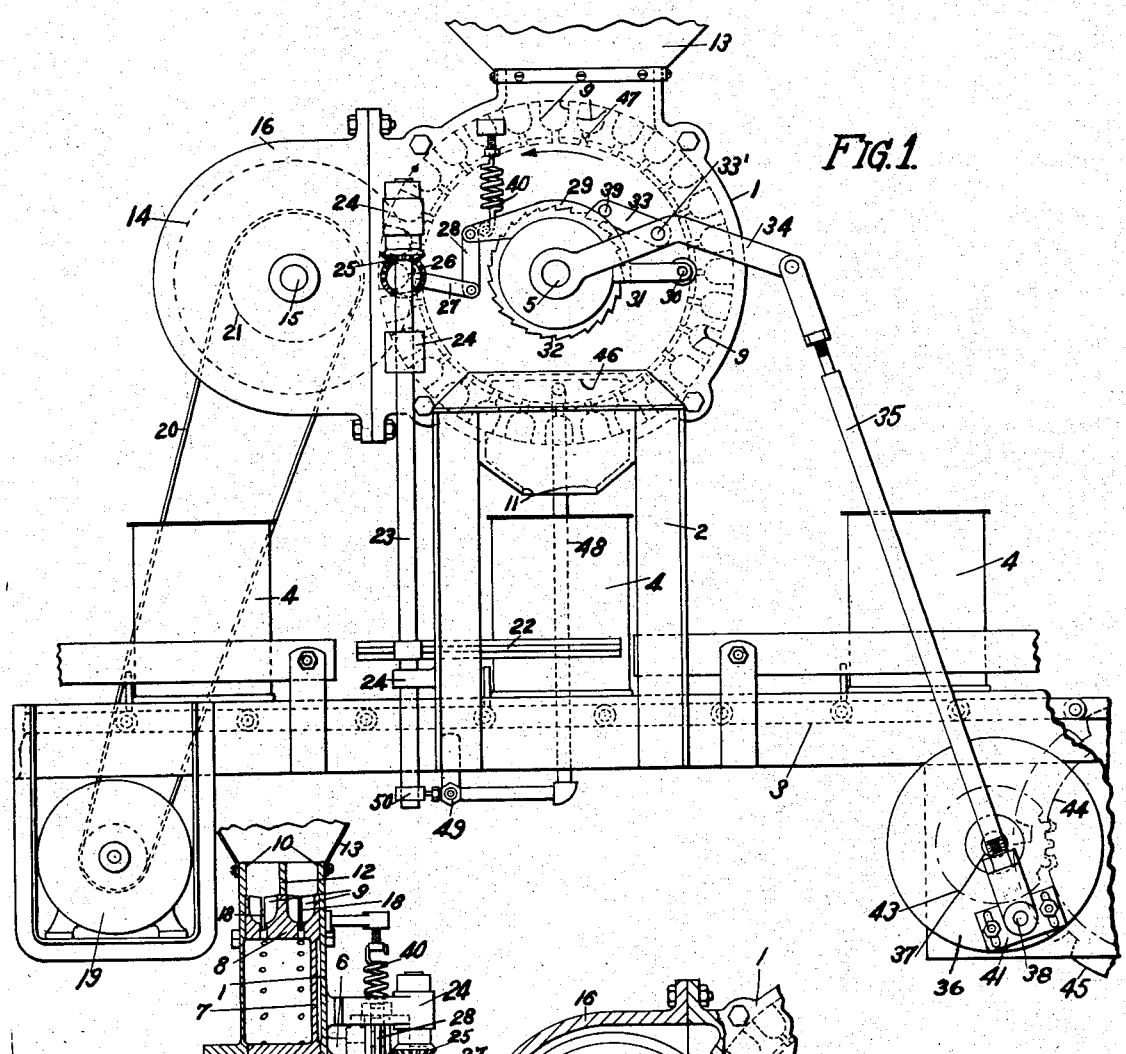
Figures 2, 3:
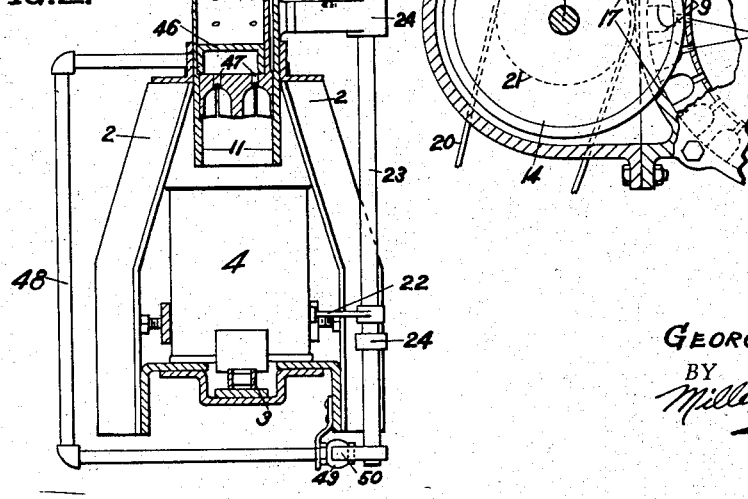
Fig. 2 is an end view of my device, partly in section, and with the cutting knives of Fig. 1 removed for clarity.
Fig. 3 is an enlarged fragmentary view of a portion of Fig. 1 with a part broken away to show the cutting knives in their position relative to the means for carrying the fruit therepast.

Briefly described, the device shown in the drawing is particularly adapted for bisecting cherries. The cherries are each supported in a recess in the outer peripheral side of a rotatably mounted drum or cylindrical conveyor and are retained therein by the cylindrical wall of a housing substantially enclosing the drum or cylindrical conveyor. A cutting knife is disposed with its edge in an annular slot extending across through the recesses for carrying the cherries, so that the cherries are bisected as the cylindrical conveyor is revolved and they are carried past the knife. The housing enclosing the cylindrical conveyor is provided with a feed opening at the top and a discharge opening at the bottom with the knife extending across the recesses intermediate said openings; hence the cherries are deposited in the recesses at the top of the cylindrical conveyor, are carried past the knife and are discharged through the discharge opening into cans presented below the discharge opening.

I have provided improved means in said device whereby the cylindrical conveyor will be rotated to carry cut cherries over the discharge opening only when a can is in position to receive the cut fruit, and I have also provided improved means for the application of fluid pressure behind the cut pieces to eject the pieces of fruit from the recesses only when a can is in position to receive said pieces, and furthermore I have provided means for depositing a predetermined quantity of fruit syrup into the can simultaneously with the discharge of the cut fruit into the can and which syrup may comprise the fluid pressure means that positively ejects the fruit pieces from the recesses.

Furthermore, I have provided means in my device for accurately regulating the number of cut pieces that are discharged into each can as desired.

In detail my invention comprises a substantially enclosed cylindrical housing 1 disposed with its flat opposed sides vertical. This housing is supported by a frame 2 above a can conveyor 3 adapted to carry cans 4 in succession therebeneath in a position to receive pieces of the cut fruit.

A horizontally disposed shaft 5 is rotatably mounted in bearings 6 on the sides of the housing and the shaft extends axially through the housing. A disk 7 axially secured to shaft 5 within the housing is provided at its outer edge with an axially extending flange or cylinder 8 rotatable within the housing with its outer peripheral surface nicely fitted against the inner peripheral surface of the cylindrical walls of the housing.

The flange or cylinder 8 will be called the fruit conveyor to distinguish it from the conveyor for the cans, which I will term the can conveyor.

The cylinder comprising the fruit conveyor is relatively thick radially, and is provided around its outer peripheral side with a double row of equally spaced, axially aligned, outwardly opening recesses 9, each recess being of a size, and formed, to receive an individual cherry.

A feed opening 10 in the upper side of the housing communicates between a hopper 13, for a quantity of cherries, and the recesses in the fruit conveyor as the recesses pass the opening when the fruit conveyor is rotated. A vertical wall 12 extending parallel of the rows of recesses and disposed therebetween, divides the opening 12 so as to direct the cherries to either of the rows of recesses.

It will be seen from the foregoing that as the cylindrical fruit conveyor is revolved past the opening 10 that is filled with cherries from the hopper, an individual cherry will drop into each recess in the conveyor, and when the cherry filled recesses pass the opening, the wall of the housing will retain the cherries in the recesses.

At the bottom of the housing is a discharge opening 11 that communicates directly between the recesses in the cylindrical fruit conveyor and the outside. Thus, if the cherries were hard pellets, instead of variable sized sticky fruit, they would drop freely out of the recesses as the recesses were uncovered by the discharge opening upon rotation of the fruit conveyor. Cherries, however, tend to remain in the recesses, and I have provided means that I will later describe for insuring against the cherries being carried past the discharge opening.

On one side of the housing and positioned between the feed opening and the discharge opening in the direction of travel of the fruit conveyor from the feed opening, I provide a pair of circular cutting knives 14 mounted on a shaft 15 rotatably mounted in bearings in opposite sides of a guard casing 16, which casing is bolted to a side of the housing as indicated.

The side of housing 1 is provided with a pair of narrow slots 17, each of a width and length to pass an edge of each of the knives therethrough, and the cylindrical fruit conveyor is provided with a pair of grooves or slots 18, each groove extending transversely across the center of the recesses of each row. The slots 17 are each disposed over and parallel with one of the grooves and the grooves are of a depth extending below the bottom of the recesses. The cutting knives are each positioned to extend through a slot 17 and into one of the grooves so that the outer edge of each knife extends to a point below the bottom of each recess. A motor 19 connected by a belt 20 to a pulley 21 on shaft 15 provides means for rotating the knives.

It will be seen from the foregoing that cherries in the recesses will be bisected by the knives as the fruit conveyor is rotated and from the knives the bisected cherries will continue in the recesses to over the discharge opening.

Since my invention is particularly adapted to deposit a predetermined number of cut cherries into cans successively presented below the discharge opening, it is highly desirable that none of the cherries be discharged through the discharge opening unless a can is in position to receive the pieces.

I therefore provide an arm 22 in a position to extend across the path of travel of the cans 4 at a point just preceding the area below the discharge opening.

Arm 22 is secured at one end to vertical shaft 23 which shaft is rotatably supported in upper and lower bearings 24 on the side of the housing and frame respectively. A bevel gear 25 is secured on said shaft adjacent the upper end thereof, which gear meshes with a bevel gear 26 rotatably mounted on the outer end of a horizontally extending stub shaft that is secured at one end to the housing.

An arm 27 projects radially from a side of gear 26, said arm being pivotally connected at its outer end to an end of a link 28, the opposite end of the link 28 being pivotally connected to one end of a generally horizontally extending arm 29 that is in the form of a yoke, the link being disposed at its end between the arms of the yoke. The opposite end of arm 29 is pivotally secured to the side of the housing at 30, the yoke arms of said arm 29 connecting at point 31 adjacent said pivot.

Secured on shaft 5 outwardly of the side of the housing is a ratchet gear 32, the upper edge of which extends between the arms of yoke 29. A pawl 33 is pivotally secured at one end at 33' to an arm 34, which arm is pivotally mounted at one end on shaft 5 so as to revolve freely on the shaft, and the opposite end of arm 34 is connected by a pitman 35 with a crank 36 secured on a shaft 37. Crank pin 38 connects the end of the pitman with the crank.

A pin 39 extends transversely through pawl 33 adjacent the outer end thereof, said pin being secured on to the pawl, and the opposite ends of the pin project outwardly of opposite sides of the pawl.

The arms of yoke 29, as already stated, lie respectively on opposite sides of the upper portion of the ratchet 32 and the outer end of the pawl 33 is adapted to engage the ratchet teeth.

The arms of the yoke are so disposed that the projecting ends of pin 39 will rest on the upper sides of the arms so the outer end of the pawl will be raised clear of the ratchet upon an upward movement of the yoke 29. However, when the pawl is revolved around the ratchet by movement of the arm 34 that supports the inner end of the pawl, and the yoke 29 is down so that the end of the pawl is in the teeth of the ratchet, the ratchet and, by consequence, the fruit conveyor, will be advanced in the direction of the arrow as indicated on Fig. 1.

The yoke 29 is normally urged upwardly by means of a tension spring 40, which spring is secured at one end to the side of the housing and at its opposite end to yoke 29 as indicated, said spring being adjustable at its upper end for obtaining the desired tension.

From the structure, as described, it will be seen that the yoke 29 will be pulled downward so as to permit the pawl to engage the ratchet, only when arm 22 is engaged and moved aside by one of the advancing cans on the can conveyor, and since crank 37 is always rotating, the pawl 33 will, by consequence, turn the ratchet and fruit conveyer so that a number of the recesses in said conveyor will be uncovered by discharge opening 11. The number of recesses thus uncovered will depend upon the throw of the crank, and this is regulated by means of an adjustable crank block 41 carrying crank pin 38. Thus I can provide so that only two bisected cherries will be disposed over opening 11 or eight bisected cherries can be so disposed, the maximum number being regulated by the size of opening 11, and the throw of the crank.

With the means thus far described, the device will operate with a fair degree of satisfaction provided the cherries do not stick in the recesses and fail to drop out when the recesses are uncovered by opening 11. However, some of the cherries will stick regardless of precaution; hence I provide means for forceably ejecting the cherries when over the discharge opening.

This means comprises a hollow pressure chamber 46, closely fitted against the inner peripheral side of the cylindrical fruit conveyor and open on the side that is against the conveyor over the area of opening 11. This chamber is stationary and is secured to the side of the housing. Each of the recesses 9 communicates with the pressure chamber through a small radially extending opening 47 in the bottom of each recess. A fluid pressure line 48 extends from the pressure chamber to outside the housing and below the can conveyor past the lower end of vertical shaft 23. Adjacent the lower end of shaft 23 the pressure line is provided with a valve 49 adapted to be actuated by a cam 50 secured on the end of the shaft. This cam is so shaped that the valve is actuated to open when the arm 22 is swung aside by one of the advancing cans, but will not open until the can is in a position to receive the fruit and the fruit conveyor is turned to deposit its fruit into the can. As the can moves on past the opening 11, and arm 22 is returned to its former position by means of spring 40, the valve will automatically close by means of a spring in said valve, said spring not being shown since such valves are standard.

I prefer to use fruit syrup in the pressure line since it is desirable that a quantity of syrup be injected into the cans together with the pieces of fruit. This insures a solid pack when the can is filled, since the fruit syrup will fill all of the interstices between the fruit pieces if it is injected into the can together with the fruit. Otherwise it is necessary to either shake the cans, with likelihood of injuring the fruit, in order to insure the filling of all the interstices between the pieces of fruit.

The conveyor 3 is, of course, actuated in proper synchronism with the movement of the fruit conveyor, and this may be accomplished in several ways. One manner of doing so is to provide a gear 43 on shaft 37 that meshes with a gear 44 that is mounted on the shaft carrying drive sprocket 45 of conveyor 3.

It is manifest, of course, that my device can be adapted to other fruit than cherries, and that the device can be used without the cutting knives if desired for merely depositing a predetermined number of pieces of fruit and a predetermined amount of syrup into cans. Also air pressure or other fluid pressure can be used in place of syrup under pressure.

I also provide different sized funnel-like attachments for securing over the discharge opening 11 where smaller sized cans are being filled.

Having described my invention, I claim:

1. Apparatus for depositing fruit into cans comprising means for positioning a can to receive the fruit, means arranged and adapted to convey the fruit to a can so positioned, means arranged and adapted to eject a predetermined number of individual fruit from the fruit conveying means into said can upon the can being positioned to receive the fruit, and means for regulating the number of individual fruit to be ejected into said can by the fruit ejecting means, and means arranged and adapted to actuate the fruit ejecting means only upon the can being positioned to receive the fruit.

2. Apparatus for depositing fruit into cans comprising means for conveying the fruit along a path of travel in spaced relation, means for successively positioning individual cans adjacent a point in said path for receiving the fruit from the fruit conveying means, means actuated by the individual can so positioned whereby fluid pressure is applied for ejecting a predetermined plurality of individual fruit from said path into said can.

3. Apparatus for depositing fruit into cans comprising means for conveying the fruit along a path of travel in spaced relation, means for successively positioning individual cans adjacent a point in said path for receiving the fruit from the fruit conveying means, means actuated by the individual can so positioned whereby fluid pressure is applied for simultaneously ejecting a predetermined plurality of individual fruit from said path into said can.

4. Apparatus for depositing fruit into cans comprising means for conveying the fruit along a path of travel in spaced relation, means for successively positioning individual cans adjacent a point in said path for receiving the fruit from the fruit conveying means, means actuated by the individual can so positioned for ejecting a predetermined plurality of individual fruit from said path into said can, and means arranged and adapted to variably limit the number of individual fruit adapted to be ejected by the fruit ejecting means as desired.

5. Apparatus for depositing fruit into cans comprising means for positioning a can to receive the fruit, means arranged and adapted to convey the fruit to the can so positioned, means actuated by the can whereby fruit syrup under pressure is applied against the fruit for ejecting the fruit into said can together with a quantity of fruit syrup upon the can being positioned to receive the fruit.

6. Apparatus for depositing a plurality of pieces of fruit into cans comprising means for conveying a plurality of individual fruit in spaced relation along a path of travel, cutting means disposed across said path for cutting the individual fruit into several pieces as the fruit is conveyed therepast, means positioning a can at a point adjacent said path beyond the cutting means for receiving the cut fruit, and means arranged and adapted to eject a predetermined plurality of pieces of the cut fruit into the can so positioned, and means actuated by said can upon its being positioned to receive the cut fruit for actuating the fruit ejecting means.

7. In apparatus as defined in claim 6, plus means for variably limiting the number of cut pieces adapted to be discharged by the fruit ejecting means.

8. Apparatus for depositing fruit into cans comprising means arranged and adapted to convey a plurality of individuel friut in spaced relation along a circular path of travel, means for positioning a can adjacent a point in the circular path of the fruit for receiving fruit from the fruit conveying means, and means actuated by the can so positioned for ejecting a predetermined number of individual fruit from said circular path into said can, means disposed adjacent the fruit conveying means for depositing fruit on said fruit conveying means and cutting means disposed across the path of the fruit intermediate the fruit depositing means and fruit ejecting means whereby the fruit is cut into several pieces before being discharged into the can.

9. Apparatus for depositing cherries into cans comprising a vertically positioned cylindrical housing, a cylinder rotatable therein on a horizontal axis, the outer peripheral surface of the cylinder being substantially in sliding contact with the inner peripheral surface of the housing, said cylinder being provided around its outer peripheral side with a plurality of spaced recesses, each recess being formed to receive a single cherry only, the upper side of said housing being provided with a feed opening for feeding cherries into said recesses, and the housing being provided at its lower side with a discharge opening adapted to uncover a plurality of said recesses whereby cherries in the recesses will be uncovered by the opening for discharge therethrough, means arranged and adapted to successively position individual cans below said discharge opening for receiving fruit ejected therethrough, means actuated by a can upon said can being positioned below said opening for rotating the cylinder a predetermined distance whereby a predetermined number of cherries are carried over the discharge opening for discharge into said can and means arranged and adapted to eject said predetermined number of cherries from the recesses and into the can, cutting means disposed adjacent a side of said cylinder and between the feed opening and discharge opening arranged and adapted to bisect the individual cherries in the recesses before the cherries are carried by rotating of the cylinder to the discharge opening.

10. Apparatus for depositing cherries into cans comprising a vertically positioned cylindrical housing, a cylinder rotatable therein on a horizontal axis, the outer peripheral surface of the cylinder being substantially in sliding contact with the inner peripheral surface of the housing, said cylinder being provided around its outer peripheral side with a plurality of spaced recesses, each recess being formed to receive a single cherry only, the upper side of said housing being provided with a feed opening for feeding cherries into said recesses, and the housing being provided at its lower side with a discharge opening adapted to uncover a plurality of said recesses whereby cherries in the recesses will be uncovered by the opening for discharge therethrough, means arranged and adapted to successively position individual cans below said discharge opening for receiving fruit ejected therethrough, means actuated by a can upon said can being positioned below said opening for rotating the cylinder a predetermined distance whereby a predetermined number of cherries are carried over the discharge opening for discharge into said can and means arranged and adapted to eject said predetermined number of cherries from the recesses into the can, means for regulating the degree of rotation of said cylinder thereby regulating the number of cherries adapted to be discharged through said discharge opening.

11. Apparatus of the character described comprising a conveyor arranged and adapted to move a row of individual whole pitted cherries in equally spaced relation along a path of travel, said conveyor being provided with a row of spaced outwardly opening hemispherically shaped recesses therein, each recess being adapted to support one of said cherries therein and said conveyor having a groove in its outer surface extending longitudinally of the row of recesses along a line bisecting the recesses, a cutting knife positioned with its cutting edge in said groove adapted to bisect cherries supported in said recesses upon movement of the conveyor past the knife, means arranged and adapted to positively eject the bisected cherries from said recesses upon movement of the conveyor to convey the bisected cherries to the ejecting means, means arranged and adapted to intermittently acuate the conveyor for moving the same a predetermined distance at separate intervals whereby a predetermined number of bisected cherries will be ejected from the conveyor at intervals, means for moving a row of cans past the cherry ejecting means adapted to successively position a can of the row for receiving the bisected cherries ejected from said conveyor.

12. Apparatus for depositing individual units of fruit into cans comprising means adapted to convey a row of vertically positioned cans in spaced relation along a path of travel, means disposed over said row arranged and adapted to intermittently convey a row of individual fruit units in spaced relation along a path of travel to a point for ejection of a predetermined plurality of said units of fruit into successive cans of the row of cans as the latter are moved along their path of travel, means whereby fluid pressure is applied to each of the predetermined plurality of individual units of fruit upon said predetermined plurality of individual units of fruit being moved to the aforesaid point for ejection into the cans.

GEORGE D. GARDNER.